United States Patent [19]

Mikhailovich et al.

[11] 3,708,644

[45] Jan. 2, 1973

[54] METHOD OF INCREASING STRENGTH OF VESSELS, PARTICULARLY HIGH-PRESSURE VESSELS

[76] Inventors: Evgeny Mikhailovich, ulitsa Akademika Kurchatova, 5a, kv. 27; Marat Moiseevich Shel, ulitsa Gorkogo, 27, kv. 28; Vladimir Grigorievich Likuchev, ulitsa Akademika Kurchatova, 9, kv. 25, all of Irkutsk, U.S.S.R.

[22] Filed: July 29, 1971

[21] Appl. No.: 167,488

[52] U.S. Cl. ................................................219/7.5
[51] Int. Cl. ..............................................H05b 5/00
[58] Field of Search ......................219/7.5, 10.41

[56] References Cited

UNITED STATES PATENTS 3,363,081  1/1968  Noriet ..................................219/7.5

Primary Examiner—J. V. Truhe
Assistant Examiner—Hugh D. Jaeger
Attorney—Eric H. Waters et al.

[57] ABSTRACT

The present invention relates to the method of increasing the strength of high-pressure vessels.

According to the invention, the method is characterized in that the electric current is passed through the wall of the vessel, the current intensity being selected to suit the internal fluid pressure in the vessel, so that the compression forces acting on the vessel wall in the direction perpendicular to that of the current flowing through the wall counterbalance the internal fluid pressure in the vessel.

4 Claims, No Drawings

METHOD OF INCREASING STRENGTH OF VESSELS, PARTICULARLY HIGH-PRESSURE VESSELS

The present invention relates to high-pressure equipment and more specifically it relates to the method of increasing the strength of vessels, particularly high-pressure ones, and can be utilized in manufacturing the high-pressure equipment for the chemical and petrochemical industries, in physical processes related to the production of synthetic minerals, and in geological explorations.

The known methods of increasing the strength of high-pressure vessel rely on the changes in the design of their individual units which contribute to a more rational distribution of loads with an account taken of the mechanical properties of the material; one example is the use of multiwall vessels.

There have also been attempts to increase the strength of the high-pressure vessels by the use of high-strength materials. However, these methods fail to produce the desired effect in increasing the strength of vessels when the latter are subjected to considerably high pressures (up to 5000–7000 kgf/cm$^2$) and temperatures (up to 500°–600°C) or made in larger sizes (up to 4.0 – 5.0 m in diameter) due to a limited resistance of the materials to the increased loads.

Production of high-pressure vessels meeting the above-quoted requirements involves serious technological difficulties and calls for the provision of special workshops, powerful load-hoisting and conveying machinery, costly erection devices. Besides, the metallurgical industry will have to cope with the problem of manufacturing new high-strength materials.

Production of industrial high-pressure vessels for higher parameters by the existing methods in likewise hardly possible.

Still, the constantly developing chemical industry urgently demands such vessels for the manufacture of up-to-date high-quality products.

Thus, the manufacture of high-quality polyethylene, synthetic minerals, etc. requires the use of vessels which are capable of withstanding pressures reaching 5000–7000 kgf/cm$^2$, have a diameter of 1.0 to 5.0 m, and the wall temperatures ranging from 300° to 600°C. Hydrocracking of oil has to be carried out in vessels of 4.0 - 5.0 m diameter, rated for a pressure of 200 kgf/cm$^2$ and 40 kgf/cm$^2$, and for a temperature of 460° to 560°C.

The existing methods of increasing the strength of the high-pressure vessels cannot solve this problem, thus holding back further development of the chemical, petrochemical and other industries.

An object of the present invention resides in eliminating the aforesaid disadvantages.

The main object of the invention is to provide a method of increasing the strength of vessels, particularly high-pressure ones, which ensures the manufacture of vessels of radically new designs, intended for higher operating parameters and larger dimensions.

This object is achieved by passing an electric current through the wall of the vessel, the current intensity being selected to suit the internal pressure of fluid in the vessel so that the originated compression forces act on the wall of the vessel in the direction perpendicular to that of the current flowing through the vessel wall, thus counterbalancing the internal pressure of fluid in the vessel.

To increase the compression forces acting on the vessel wall through which the electric current flows, it is practicable that said wall should be surrounded by a material with a high magnetic permeability.

It is also possible to pass a pulsating current through the wall of the vessel, thus increasing the compression forces acting on the vessel wall.

The claimed method of increasing the strength of the vessels realized in accordance with the present invention will accomplish successfully the above objects.

Now the invention will be made more apparent by describing in detail some examples of realization of the method of increasing the strength of vessels, particularly high-pressure ones.

The claimed method of increasing the strength of vessels subjected to internal pressure is based on the principle of interaction of current-carrying conductors said principle being widely known in electrical engineering.

Two parallel conductors carrying unidirectional currents are attracted to each other, the force of attraction being dependent on the length of said conductors, the distance between them, and the intensity of current they carry. The wall of the vessel under current may be regarded as a combination of an infinitely large number of current-carrying conductors that are attracted to each other thus producing compression forces in the vessel wall. The compression forces which arise in the wall of a vessel under current and act perpendicularly to the direction of current flow, prevent the wall from being stretched by the internal pressure, i.e. the compression forces relieve, partly or completely, the vessel wall of the internal pressure in the direction perpendicular to that of the current.

If the electric current flowing through the wall of a vessel is directed parallel to the generatrices of the wall, the developing compression forces will act perpendicularly to the generatrices in a circular direction which means that the compression forces relieve the vessel wall, partly or completely, of the internal pressure in a circular direction.

If the electric current flowing through the wall is directed at an angle to the wall generatrices, the compression forces arising in said wall act at the same angle, perpendicularly to the generatrices. In this case the compression forces can be resolved according to the parallelogram law of forces into two compression forces directed axially and circularly in the vessel, thus relieving its wall, partly or completely, of the internal pressure in both directions.

The electric current can be supplied from one or more power sources (capacitor banks, d.c. generators, transformers with rectifiers, etc.) through one or more buses to special bandages welded to the shell of the vessel. On large vessels the current must be supplied from several power sources for more uniform distribution of the current over the entire section of the vessel wall, and for decreasing the inductance of the supply line in case of pulsating power supply. Continous and infallible operation of vessels will be ensured by providing some kind of emergency power supply, such as storage batteries and stand-by supply sources.

In case of pulsating current, the inductance of the supply line should be as low as possible to ensure a lower capacity of the capacitor banks.

The system of connections in pulsating supply from a number of sources should provide for their simultaneous discharge through the wall of the vessel.

The electric current can be directed at a certain angle to the generatrix of the vessel wall by various methods, for example by changing the direction of maximum conductivity of the wall (making spiral grooves, welding narrow copper strips at the required angle to the generatrices, etc.) and by superposing an additional magnetic field.

The required compression forces which counterbalance the internal pressure of fluid in the vessel can be produced only by heavy currents.

For example, for using the claimed method on a vessel with an inside diameter of 4.0 m and a pressure of 200 kgf/cm$^2$ it is necessary to provide 1500 sources of electric energy, each capable of producing a current of $10^4$ A in the vessel wall. For a vessel with an inside diameter of 2.0 m and a pressure of 5000 kgf/cm$^2$, 5000 sources of electric energy must be provided, each capable of producing a current of $10^4$A in the wall of the vessel. The thermal energy liberated by the electric current flowing through the vessel wall can be removed by the cooling agent and the subsequently utilized.

To reduce the current required for obtaining adequate compression forces, the vessel must be surrounded by a material of high magnetic permeability, for example annealed iron plates of wire. This will reduce the required current $\sqrt{\mu}$ times ($\mu$ = magnetic permeability).

However, it should be noted that magnetic permeability diminishes with the increase in the intensity of the magnetic field on the outer surface of the vessel wall.

Intensity of the magnetic field increases with the increased current and decreases with the increase in the diameter of the vessel.

Hence, enclosing the vessel with a material characterized by high magnetic permeability yields optimum results in large-diameter vessels. For example, at pressures of 10–200 kgf/cm$^2$ the best practice is to make vessels in a diameter range of 10 to 100 m.

Operation of a vessel 20.0 m in diameter at a pressure of 20.0 kgf/cm$^2$ requires 100 sources of electric energy, each creating a current of $10^4$A in the vessel wall, an approximate power of such a vessel ranging from 3000 to 5000 kW.

Such vessels can be used for the storage of various chemicals (e.g. ammonia, etc.).

For a vessel of 100–200 m diameter and a pressure of 200 kgf/cm$^2$, 1000 sources of electric energy are required, each creating a current of $10^4$A in the vessel wall ; the power in this case will be approximately 50,000 – 100,000 kW.

Such vessels can be used for building up a line of high-pressure installations for synthesis of ammonia, for hydrocracking of oil, etc.

The thermal energy produced in the process can be used for auxiliary purposes.

The manufacture of vessels with a diameter of 100 to 200 m and a pressure of 200 kgf/cm$^2$ with the wall temperature varying from 400° to 500°C is impossible by the use of the known methods. The wall thickness in such vessels should be from 5.0 to 10.0 m.

While building pressure vessels by the use of the claimed method, the wall thickness should be selected to suit technological requirements and it should not be smaller than 5–10 mm.

If it becomes necessary to use vessels of relatively small diameters (below 10.0 m) for pressures above 100 kgf/cm$^2$, the vessel wall is not enveloped by a material with a high magnetic permeability. It should be borne in mind, however, that strong compression forces in the vessel wall will call for passing very heavy currents through it.

This involves the use of powerful supply sources with a complicated and powerful cooling system which is unjustifiable for the operation of small-capacity vessels, and limits the intensity of the currents used and, as a consequence, the allowable internal pressures.

To increase the current flowing through the vessel wall and, consequently, to raise the compression forces arising in the vessel wall and the allowable internal pressures, the electric current is passed through the vessel wall by short pulses.

A current pulse can be obtained for example, by discharging a bank of capacitors through the wall.

This produces momentary compression forces in the wall, said forces opposing the internal fluid pressure in the vessel.

The allowable internal pressure of the fluid in the vessel will depend on the intensity of the current which, in turn, depends on the capacity of the capacitor bank.

By increasing the capacity of the capacitor banks it becomes possible to increase the allowable internal pressure of the fluid in the vessel.

The required discharge frequency is determined by the charging time of the capacitor bank which, in turn, depends on the power of the charging device.

By passing a pulsating current through the vessel wall, it is possible to make vessels within a wide range of pressures and diameters.

For example, it is possible to make a vessel for a pressure of 12,000 kgf/cm$^2$ with an inside diameter of 20 mm. In this case the bank of capacitors will consist only of 200–500 capacitors, each rated for 2000 mfd, 500 V.

A 1-minute pulse will require a power of about 1 kW while for a 1-second pulse this power requirement will rise to 50 kW.

Such vessels can be of use for research work in physics, geology, chemistry, and for the production of single crystals.

The vessel with a pressure of 5000–6000 kgf/cm$^2$ requires a capacitor bank comprising 2000–3000 capacitors, each rated for 2000 mfd, 500 V.

A pulse whose duration is 1 minute requires a power of about 10 kW; 1- second and 1/10-second pulses will require a power of 700 and 7000 kW, respectively. Such vessels can be utilized in the production of polyethylene and for research purposes in chemistry, physics and geology.

It is possible to build a vessel rated for 5000 kgf/cm$^2$ with a diameter of 2.0 m. This vessel will require a capacitor bank comprising 60,000 capacitors, each rated for 2000 mfd. 500 V.

The approximate power needed for 1-minute and 1-second pulses is, respectively, 250 and 15,000 kW. Such vessels can find application for testing various equipment under external pressure, and for other purposes.

The electric current can also be passed through the vessel wall by individual pulses when the vessel is surrounded by a material with a high magnetic permeability. This will make for a considerable reduction in the power of the energy source, provided it is allowable to have momentary compression pulses in the vessel wall and, consequently, momentary high-pressure pulses.

For example, for building a vessel of 100–200 m diameter with pressure pulses of 200 kgf/cm$^2$, a capacitor bank must be provided, comprising 100,000 – 200,000 capacitors rated 2000 mfd, 500 V or a correspondingly smaller number of capacitors, though possessing, each, a higher capacity.

For 1-minute pulses, a power of 50–100 kW is required. Such vessels can be used for testing various large items of equipment under external pressures (bathyscaphes, etc.).

In all the versions of the vessels built in accordance with the claimed method, the electric current flowing through the vessel wall can be used simultaneously for heating the vessel wall and the fluid contained inside.

If the amount of thermal energy liberated during the passage of pulsating current is insufficient, it is possible simultaneously to pass direct current through the vessel wall in order to heat the wall and the fluid in the vessel. For example, such heating will be necessary in the reaction vessel for the production of polyethylene.

When pulsating current passes through the wall of the vessel, the latter can be made as an ordinary vessel whose shell is designed for a lower pressure while the roof, bottom, and the fastening parts are calculated for a higher service pressure. On applying a current pulse, the pressure in the vessel rises to the service level. Such a design is possible, for example, in the reaction vessel for the production of polyethy-lene.

What is claimed is:

1. A method of increasing the strength of vessels, particularly high-pressure ones comprising, passing electric current through the vessel walls, perpendicular to the direction of internal pressure, the current intensity being selected in correspondence with the internal pressure on the fluid in the vessel, so that the internal compression forces act on the wall of the vessel in a direction perpendicular to that of the current flowing through the wall of said vessel, thus counterbalancing the internal pressure of fluid in said vessel.

2. A method according to claim 1 wherein the compression forces acting on the vessel wall when an electric current passes through it are increased by surrounding said wall with a material with a high magnetic permeability.

3. A method according to claim 1 wherein the current passing through the vessel wall is of the pulsating type which increases the compression forces acting on the wall of said vessel.

4. A method according to claim 2 wherein the current passing through the vessel wall is of the pulsating type which increases the compression forces acting on the wall of said vessel.

* * * * *